United States Patent
Shin et al.

(10) Patent No.: US 9,494,420 B2
(45) Date of Patent: Nov. 15, 2016

(54) OPTICAL ALIGNMENT DEVICE USING UV PULSE

(71) Applicant: KOREA INSTITUTE OF INDUSTRIAL TECHNOLOGY, Seobuk-gu, Chungcheongnam-do (KR)

(72) Inventors: Gyo Jic Shin, Chungcheongnam-do (KR); Sang Kug Lee, Gyeonggi-do (KR); Kyung Ho Choi, Hwaseong-si (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 0 days.

(21) Appl. No.: 14/787,438

(22) PCT Filed: Nov. 25, 2013

(86) PCT No.: PCT/KR2013/010738
§ 371 (c)(1),
(2) Date: Oct. 27, 2015

(87) PCT Pub. No.: WO2014/178508
PCT Pub. Date: Nov. 6, 2014

(65) Prior Publication Data
US 2016/0146597 A1    May 26, 2016

(30) Foreign Application Priority Data
Apr. 30, 2013   (KR) .......................... 10-2013-0048301

(51) Int. Cl.
*G02B 27/28*   (2006.01)
*G02B 5/30*    (2006.01)
(Continued)

(52) U.S. Cl.
CPC .............. *G01B 11/27* (2013.01); *C09K 19/56* (2013.01); *G02F 1/1303* (2013.01); *G02F 1/133788* (2013.01)

(58) Field of Classification Search
CPC   G02B 5/3083; G02B 5/3025; G02B 5/3033; G02B 5/3058; G02B 27/18; G02B 27/28; G02B 27/283; G02B 3/0006; G02B 3/0031; G02B 3/005; G02B 3/0068; G02B 5/045; G02B 5/23; G02B 5/30; G02B 5/3016; G02F 1/133528; G02F 1/133536; G02F 1/13363; G02F 1/133634
USPC ......... 359/487.02, 489.07, 487.06, 241, 352, 359/462, 464, 465, 485.05, 489.03, 489.14, 359/489.15, 619; 250/504 R, 492.1, 493.1
See application file for complete search history.

(56) References Cited

U.S. PATENT DOCUMENTS 6,982,773 B2 *  1/2006  Kurtz ..................... G02B 27/18
                                                        348/E9.027
7,206,059 B2 *  4/2007  Flagello .............. G03F 7/70566
                                                        355/71

(Continued)

FOREIGN PATENT DOCUMENTS

JP   10-123523 A   5/1998
JP   11-014995 A   1/1999
(Continued)

OTHER PUBLICATIONS

Written Opinion dated Jan. 10, 2014 for PCT/KR2013/010738 in 7 pages.

(Continued)

*Primary Examiner* — David A Vanore
(74) *Attorney, Agent, or Firm* — Knobbe, Martens, Olson & Bear, LLP (57) ABSTRACT

An optical alignment device using pulse UV irradiates an alignment film with pulse UV to perform optical alignment of liquid crystal. The optical alignment device using pulse UV may include a chamber, a lamp which is installed at an upper portion of the chamber and emits pulse UV light, a stage which is provided at a lower portion of the chamber and on which a substrate having an alignment film formed on a surface thereof is placed, and a polarizer which is installed detachably between the stage and the lamp.

10 Claims, 5 Drawing Sheets

(51) Int. Cl.
  *G01B 11/27* (2006.01)
  *G02F 1/13* (2006.01)
  *G02F 1/1337* (2006.01)
  *C09K 19/56* (2006.01)

(56) References Cited

U.S. PATENT DOCUMENTS

| | | | | |
|---|---|---|---|---|
| 7,232,594 | B2* | 6/2007 | Miroshin | G02B 3/005 |
| | | | | 349/106 |
| 7,391,569 | B2* | 6/2008 | Ralli | G02B 5/305 |
| | | | | 348/E9.027 |
| 7,583,342 | B2* | 9/2009 | Maruyama | G02B 5/3083 |
| | | | | 349/117 |
| 8,379,169 | B2* | 2/2013 | Kitagawa | B29C 55/026 |
| | | | | 349/96 |
| 8,934,170 | B2* | 1/2015 | Takeda | G02B 5/23 |
| | | | | 359/241 |
| 8,982,197 | B2* | 3/2015 | Kim | G02B 5/3083 |
| | | | | 348/58 |
| 9,097,938 | B2* | 8/2015 | Eckert | G02F 1/133711 |
| 2013/0035446 | A1 | 2/2013 | Eckert et al. | |

FOREIGN PATENT DOCUMENTS

| | | |
|---|---|---|
| JP | 4626039 B2 | 2/2011 |
| JP | 2012-198522 A | 10/2012 |
| JP | 2013-061372 A | 4/2013 |
| KR | 10-0423213 | 3/2004 |
| KR | 10-0423213 | 6/2004 |
| KR | 10-2008-0001406 A | 1/2008 |
| KR | 10-2008-0043610 A | 5/2008 |
| KR | 10-2009-0080892 A | 7/2009 |
| KR | 10-2013-0035631 A | 4/2013 |
| KR | 10-2013-0045029 A | 5/2013 |
| KR | 1013922190000 | 4/2014 |
| KR | 1015271650000 | 6/2015 |
| WO | WO 2015/002353 A1 | 1/2015 |

OTHER PUBLICATIONS

International Search Report Dated Jan. 10, 2014 for PCT/KR2013/010738.

* cited by examiner

OPTICAL ALIGNMENT DEVICE USING UV PULSE

CROSS REFERENCE TO RELATED APPLICATIONS

This application is the U.S. National Phase of International Application No. PCT/KR2013/010738, filed Nov. 25, 2013, designating the U.S. and published in Korean as WO/2014/178508 on Nov. 6, 2014 which claims the benefit of Korean Patent Application No. 10-2013-0048301, filed Apr. 30, 2013. Any and all applications for which a foreign or domestic priority claim is identified here or in the Application Data Sheet as filed with the present application are hereby incorporated by reference under 37 CFR 1.57.

TECHNICAL FIELD

The present invention relates, in some embodiments, to an optical alignment device and, more specifically, to an optical alignment device using pulse UV which irradiates an alignment film with pulse UV to perform optical alignment of liquid crystal.

BACKGROUND ART

According to advance of a liquid crystal panel manufacturing technique, liquid crystal display elements are widely used in field of an optical information process.

Conventionally, a Twisted Nematic (TN) display method is most frequently applied as a liquid crystal display element applied to small and medium displays and this is a technique of installing electrodes on two substrates, respectively, arranging liquid crystal directors to be twisted by 90°, and then applying voltage to the electrodes to operate the liquid crystal directors.

The TN liquid crystal display element provides excellent contrast and color reproducibility, and a vertical alignment (VA) mode liquid crystal display element in which longitudinal axes of liquid crystal molecules are arranged to be vertical to upper and lower display plates in a state where electric field is not applied has a high contrast ratio and has been prominent. However, the TN liquid crystal display element has a problem of a narrow viewing angle.

In order to solve such a problem of a viewing angle in the TN manner, a patterned vertically aligned mode (PVA mode) of applying an incision to a vertical alignment mode liquid crystal display device, and an in-plane switching mode (IPS mode) of forming two electrodes on one substrate and adjusting directors of liquid crystal by transverse electric field generated between two electrodes have been introduced.

Then, in order to improve a low opening ratio and transmissivity of the IPS mode, a fringe field switching mode (FFS mode) of forming a gap between a counter electrode and a pixel electrode to be narrow while forming the counter electrode and the pixel electrode are formed of transparent conductivities, and operating liquid crystal molecules by fringe field formed between the counter electrode and the pixel electrode has been emerged.

Meanwhile, in order to solve a problem that optical efficiency of the FFS mode is lower than that of the TN mode, an FIS mode was developed, thus it is possible to improve low transmissivity between pixel electrodes in the conventional FFS mode and to achieve a liquid crystal display element capable of operating with low voltage in an voltage applying manner through two thin film transistors.

In addition, each of these modes has unique liquid crystal arrangement and optical anisotropy. Accordingly, in order to compensate for phase difference based on the optical anisotropy of the liquid crystal modes, an optical phase difference film with optical anisotropy corresponding to each mode is required. The optical phase difference film was developed as a color compensation film of an LCD, but recently, more variety of functions such as high-wavelength ecentralization, wide viewing angle, temperature compensation, and high phase difference value film are required.

In the case of a liquid crystal display device, it is general that alignment of liquid crystal molecules controlled in advance is changed to another alignment state by applying electric field, a polarization direction or a polarization state of passing light is changed, and this change is displayed by changing to contrast of brightness by a polarizer or the like.

As a general method of aligning liquid crystal, a contact rubbing method of applying a polymer film such as polyimide to a substrate such as glass and rubbing this surface in a predetermined direction with fiber such as nylon polyester is used. Liquid alignment based on the contact rubbing method described above has an advantage of obtaining simple and stable alignment performance of liquid crystal. However, when the polymer film is rubbed with fiber, fine dust and electrostatic discharge (ESD) occurs to damage the substrate and, according to enlargement of rolls caused by increase in processing time and enlargement of glass, a significant problem may be caused during manufacturing a liquid crystal panel due to difficulty in process such as unevenness of rubbing strength.

In order to solve the problem of the contact rubbing method described above, new methods for manufacturing a non-contact alignment film have been actively studied. As the methods for manufacturing a non-contact alignment film, there are an optical alignment method, an energy beam alignment method, a vapor deposition alignment method, an etching method using lithography, and the like.

Particularly, the optical alignment method means mechanism of forming a photopolymerization liquid crystal alignment film in which a photoreactive material coupled to photoreactive polymer causes optical reaction by linearly polarized UV to have predetermined arrangement, thereby aligning liquid crystal finally.

To this end, when linearly polarized UV is irradiated, a photoreactive material has to have characteristics of being arranged at a predetermined angle and in a predetermined direction according to a polarization direction, and has to be well matched to reactive liquid crystal to well achieve liquid crystal alignment by interaction with reactive liquid crystal. Particularly, an optical alignment material forming an optical alignment film has to good in physical properties such as printing property, alignment stability, and thermal stability.

As optical reaction based on UV irradiation, photopolymerization reaction of cinnamate, coumarin, chalcone, stilbene, diazoacetic, and the like, photoisomerizable reaction of cis-trans isomerization, and molecular chain break of decomposition have been already known. There are examples of applying such molecular optical reaction based on UV to liquid crystal alignment based on UV irradiation through design of appropriate alignment film molecules and optimization of UV irradiation conditions.

For example, Korean Registered Patent Publication No. 10-0423213 discloses a manufacturing method of a liquid crystal alignment film and a liquid crystal display element having the liquid crystal alignment film, wherein alignment performance is granted by irradiation of linearly polarized UV without performing a rubbing process. Particularly, in Japan, Korea, Europe, USA, and the like related to LCD industries, a lot of patents related to such optical alignment methods have been applied. However, after deriving an initial idea, some have been in mass production, but would not have been generally and widely applied in industrial field.

This is because simple liquid crystal alignment can be induced by the optical reaction but stable alignment characteristics cannot be maintained or provided in terms of external heat, light, physical impact, chemical impact, and the like. In other words, the optical alignment method is low in productivity or reliability as compared with the rubbing method. The main causes of such problems are alignment anchoring energy lower than that of the rubbing method, low alignment stability of liquid crystal, and the like.

SUMMARY

The invention has been made to solve the problems described above, and an object of the invention is to provide an optical alignment device using pulse UV, capable of maximizing productivity and efficiency of optical reaction by reducing a processing time of an optical alignment agent using polarized pulse UV.

In addition, another object of the invention is to provide an optical alignment device using pulse UV to have excellent phase difference ability due to having alignment property and alignment stability.

According to a preferred embodiment of the invention, there is provided an optical alignment device using pulse UV including: a chamber; a lamp which is installed at an upper portion of the chamber and emits UV light; a stage which is provided at a lower portion of the chamber and on which a substrate having an alignment film formed on a surface thereof is placed; and a polarizer which is installed detachably between the stage and the lamp.

Herein, the lamp emits pulse UV light.

In this case, the lamp may be installed in a housing installed on one side of the upper portion of the chamber.

In addition, the polarizer is installed to be replaceable on a support base installed between the lamp and the stage.

In this case, the support base is installed horizontally between the lamp and the stage and has an opening portion opened up and down on one side, and a coupling portion having a slide groove is formed along an edge of the opening portion to insert and mount the polarizer.

In this case, the support base may be installed to rise and fall in the chamber.

In addition, the stage may be installed to be slid and also may be installed to adjust a height thereof.

In this case, the pulse UV light has energy of 0.1 mJ/pulse to 500 J/pulse.

In addition, it is preferable that the pulse UV light is irradiated at 1 Hz to 60 Hz.

DETAILED DESCRIPTION OF CERTAIN EMBODIMENTS

Hereinafter, a preferred embodiment of an optical alignment device using pulse UV according to the invention will be described with reference to the accompanying drawings. In this course, thicknesses of lines and sizes of constituent elements illustrated in the drawings may be illustrated to be magnified for clarity and convenience of description.

In addition, terms to be described later are terms defined considering functions in the invention, and may be varied according to intends of users and operators or convention. Therefore, the definition for such terms should be based on the overall contents of the specification.

Moreover, the following embodiment does not limit the scope of rights, is merely exemplary items of constituent elements presented in Claims of the invention, and is included in the technical spirit throughout the specification of the invention, and an embodiments including constituent elements which can be replaced as equivalents in the constituent elements of Claims may be included in the scope of rights of the invention.

Figure 1:
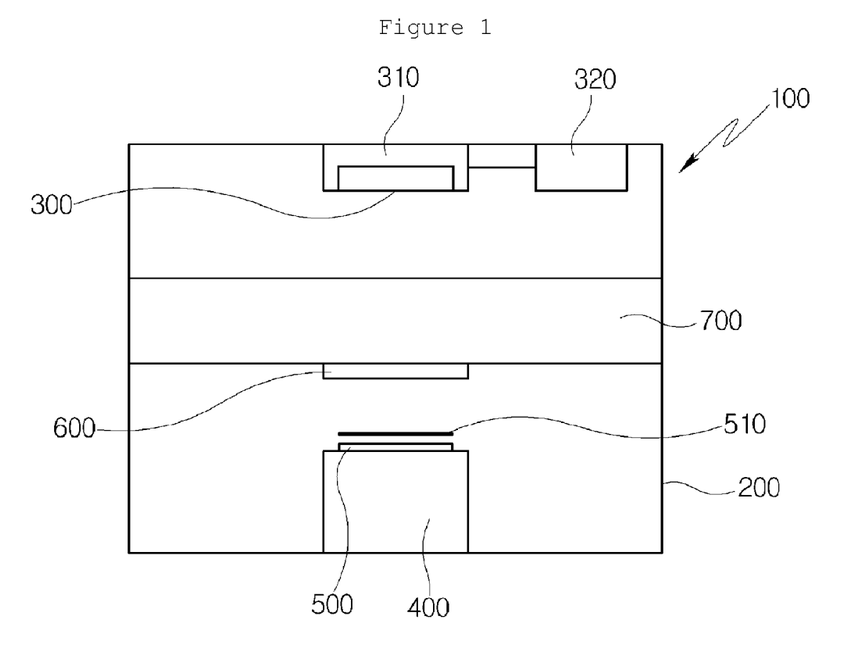
FIG. 1 is a schematic diagram illustrating an optical alignment device using pulse UV according to an embodiment of the invention.

FIG. 1 is a schematic diagram illustrating an optical alignment device using pulse UV according to an embodiment of the invention.

As illustrated in FIG. 1, an optical alignment device 100 using pulse UV (hereinafter, referred to as 'optical alignment device') according to an embodiment of the invention includes a chamber 200, a lamp 300 which is installed at an upper portion of the chamber 200 and emits pulse UV light, a stage 400 which is provided at a lower portion of the chamber 200 and on which a substrate 500 is placed, and a polarizer 600 which is installed detachably between the stage 400 and the lamp 300.

In this case, the lamp 300 may include a pulse UV light source and a lens, and it is preferable to be installed in a housing 310 provided at the upper portion of the chamber 200. The lamp 300 may be made of a material with high transmission efficiency of UV, for example, quartz or sapphire, and may be formed in various shapes such as a linear pipe shape, a U shape, and a spiral shape. However, in order to uniformly irradiate the target object 500 with pulse UV, it is preferable to manufacture the lamp 300 in a shape similar to the shape of the substrate 500.

The stage 400 may be installed to be slid forward, backward, left, and right. To this end, for example, a guide rail which guides a movement direction of the stage may be provided on a bottom face of the chamber, and a movement cylinder or a motor which moves the stage may be provided on one side in the chamber. In this case, a cylinder rod end of the movement cylinder is coupled to one side of the stage 400, or one end of a lead screw coupled to a motor shaft is screw-coupled to one side of the stage 400.

In addition, the stage 400 may be installed to adjust a height thereof by the operation of the cylinder or the motor. In this case, it is possible to adjust a gap between the polarizer 600 or the lamp 300 and the substrate 500 placed on the stage 400. An alignment film is formed on the surface of the substrate 500. In this case, the alignment film may be made of, for example, a material based on polyimide, polyvinyl, polysiloxane, polyacryl including optical reaction of cinnamate, chalcone, coumarin, stilbene, and diazoacetic.

The substrate 500 includes a photomask 510. The photomask 510 is positioned on the substrate 500 coated with the alignment film, and can form a multi-domain pattern. In this case, the photomask 510 may be attached to the surface of the substrate 500, and may be disposed separately on the upper portion of the substrate 500.

A method of forming the multi-domain pattern using the photomask 510 may be, for example, a method of forming a first domain using a photomask in primary exposure, and removing the photomask and then performing whole face exposure in secondary exposure, and a method of performing whole face exposure at first and then performing partial secondary exposure using a photomask. In this case, since polarization directions at the time of the primary exposure and the secondary exposure are different, it is necessary to configure the polarizer 600 or the substrate 500 to be rotatable or movable in order to adjust the polarization directions. To the optical alignment device 100 according to an embodiment of the invention, power is supplied by a DC power supplier (not illustrated) provided on one side of the chamber 200. The power with predetermined energy supplied as described above is stored in a form of current by a capacitor and is accumulated as high energy. The accumulated high energy is converted in to a pulse waveform by a pulse generator 320, and a shape, a waveform, and a wavelength of the pulse are determined according to kinds of the pulse generator 320 and the UV lamp 300. The high energy in the pulse form input by the pulse generator 320 is irradiated to the substrate 500 in the pulse UV form by the lamp 300.

Meanwhile, the optical alignment device 100 according to the embodiment of the invention may further include a band pass filter (not illustrated) which is disposed between the lamp 300 and the polarizer 600. By the band pass filter, the wavelength of the pulse UV irradiated from the lamp 300 can be appropriately adjusted.

Figure 2:
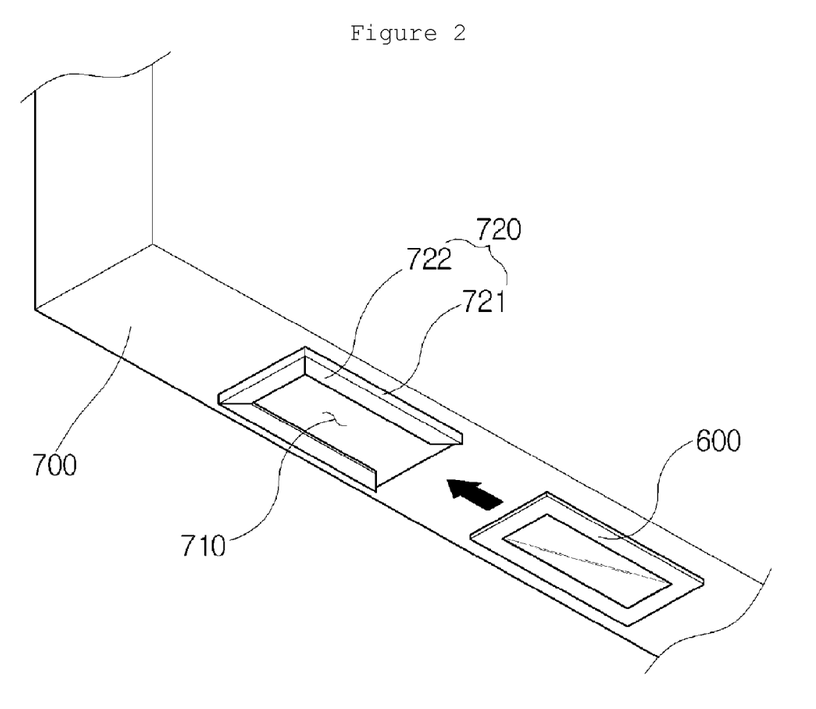
FIG. 2 is a perspective view illustrating a support base according to an embodiment of the invention.

FIG. 2 is a perspective view illustrating a support base according to an embodiment of the invention.

A hexahedron base shaped support base 700 is installed horizontally in the chamber 200, across between the lamp 300 and the stage 400. One side of the support base 700 is opened up and down, which is for the purpose that the pulse UV emitted from the lamp 300 passes through the support base 700 and is irradiated to the substrate 500 on the stage 400.

The polarizer 600 is installed in an opening portion 710 on the bottom face of the support base 700, and the pulse UV emitted from the lamp 300 is polarized. In this case, it is preferable that the opening portion 710 and the substrate 500 are formed to have an area corresponding to an area in which the energy of pulse UV and the uniformity of strength are 80% or more. In addition, it is preferable that the polarizer 600 is installed to be fixed or detached to the opening portion 710 of the support base 700. To this end, a coupling portion 720 having a slide groove is formed along an edge of the opening portion 710 of the bottom face of the support base 700.

The coupling portion 720 includes an extension portion 721 formed to extend downward along the edge of the opening portion 710, and a placement portion 722 formed to be bent inward at the lower end of the extension portion 721, and one side of the extension portion 721 is opened. In other words, when the opening portion 710 is formed in a rectangular cross-sectional shape, one corner of the coupling portion 720 is opened, and the polarizer 600 can be slide-coupled to the coupling portion 720 through the opening portion.

The support base 700 may be installed to rise and fall in the chamber 200. For example, a guide rail which guides a rising and falling direction of the support base 700 may be provided on an inner wall of the chamber 200, and the support base 700 may be configured to rise and fall along the rail by the operation of the movement cylinder or the drive of the motor. In this case, the cylinder rod end of the movement cylinder is coupled to one side of the support base 700, or one end of a lead screw coupled to the motor shaft is screw-coupled to one side of the support base 700. As described above, when the support base 700 is installed to rise and fall, a gap between the polarizer 600 and the lamp 300 or between the polarizer 600 or the substrate 500 can be freely adjusted as necessary.

Meanwhile, the support 700 may be configured to rotate the polarizer 600 and, for example, may be configured to rotate the entire of the support base 700 along the guide groove formed on the inner peripheral face of the inner wall of the chamber 200 by the drive of the motor. As another example, the coupling portion 720 coupled to the polarizer 600 may be manufactured by a separate member, and the coupling portion 720 may be configured to rotate on the support base 700 by the drive of the motor. In this case, in a state where the support base 700 and the polarizer 600 are fixed, the stage 400 may also be configured to rotate together with the substrate 500.

The movement or rotation of the stage 400, the support base 700, and the coupling portion 720 may be controlled by a controller (not illustrated) provided outside the chamber 200, and multi-domains having alignment direction different from each other can be formed on the substrate 500 by the movement of the stage 400 and the rotation of the support base 700 or the coupling portion 720.

In other words, when the surface of the substrate 500 is divided into the plurality of domains, for example, the first domain is subjected to an optical alignment process, then the stage 400 is moved to position the second domain at the lower portion of the polarizer 600, the polarizer 600 is rotated by a predetermined angle, and then the second domain is irradiated with pulse UV, thereby making liquid crystal alignment directions of the first domain and the second domain different from each other.

Figure 3:
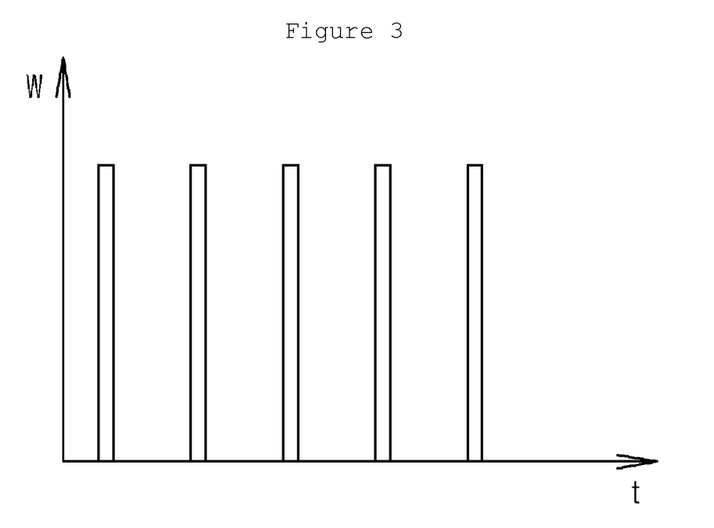
FIG. 3 is a schematic diagram illustrating characteristics of pulse UV.

FIG. 3 is a schematic diagram illustrating characteristics of pulse UV.

In FIG. 3, an x axis denotes a time (t), and a y axis denotes peak power having a unit of W (watt). A general UV irradiation method applied to a process such as hardening is a method of continuously irradiating UV having predetermined energy but, in the invention, UV having high energy is irradiated in a form of pulse. Such pulse UV is irradiated only for a very short time, and is cooled for a relatively long time. In other words, since a duty cycle (time when pulse is turned on/total time when pulse is repeated×100(%)) has a very small value less than 1%, overall, the irradiation time is short, the cooling time is long, and thus heat is not generated in the course of pulse UV irradiation, which is an advantage.

The pulse UV polarized by the polarizer 600 according to the embodiment of the invention can output a wavelength of 50 nm to 800 nm. The polarized pulse UV can emit light with a wavelength of a visible light area of 400 nm to 800 nm as well as light of an ultraviolet area of 50 nm to 400 nm.

Accordingly, each of the conventional mercury UV lamp, metal halide lamp, and gallium UV lamp emits light only in a specific wavelength of the ultraviolet area, whereas the lamp 300 of the invention can emit light in a wide wavelength area.

The polarized pulse UV may be irradiated with a pulse width of 20 microseconds, a waveform of a pulse of 1 to 60 Hz per second, and 0.1 mJ/pulse to 500 J/pulse. Accordingly, for example, when the conventional UV lamp continuously irradiates light at 100 mW for 12 seconds to align an optical alignment layer, the lamp 300 of the invention can align the optical alignment layer of the substrate even when irradiating light, for example, for 0.02 seconds or less, due to strong irradiation energy and intensity of the pulse UV. In other words, according to the invention, there is an advantage of reducing a processing time according to reduction of a light irradiation time during optical alignment, and improving productivity. In addition, since light is irradiated only for an extremely short time, it is possible to prevent thermal damage and thermal deformation of the optical alignment film.

In the light emitting lamp, difference between light intensity of a spot corresponding to a lamp center and light intensity of an ambient portion thereof more significantly occurs as a distance from a surface of an target object gets longer. Accordingly, UV light intensity and uniformity are more excellent as getting closer to the substrate 500 but, in the conventional case, it should keep a minimum irradiation distance due to thermal deformation which the substrate 500 directly receives. Generally, an irradiation distance of about 100 to 150 mm is secured. In this case, there is difference of about 30% in uniformity between the lamp center and the ambient portion.

However, in the case of the lamp 300 according to the embodiment of the invention, less heat occurs according to irradiation of pulse UV, and there is no thermal influence on the surface of the substrate 500. Accordingly, it is possible to irradiate the pulse UV as close (for example, within 5 mm) to the surface of the substrate 500 as possible, and it is possible to keep uniformity of light intensity in a level of substantially 100%.

In addition, since the polarized pulse UV irradiates the optical alignment layer of the substrate 500 with a momentary pulse wave for an ultra-short time, it has strong penetration during optical alignment. As a result, the polarized pulse UV can perform uniform optical alignment even on a thickness layer in which an optical alignment layer is thick.

In terms of costs, the polarized pulse UV can reduce power consumption by 80% or more as compared with the case of using the conventional arc discharge lamp. Since the polarized pulse UV uses momentary UV energy, power consumption is reduced.

In addition, the polarized pulse UV has a momentary ON/OFF function, the lamp can be OFF when UV irradiation is unnecessary on process flow, there is an energy saving effect, and an opening and closing device such as a shutter is unnecessary. In addition, there is a lift extension effect of a lamp or equipment due to decrease in heat. Moreover, replacement costs of expendables such as a cold mirror and a hot mirror used in the conventional UV lamp are not necessary, and thus there is an advantage in economic aspects.

Figure 4:
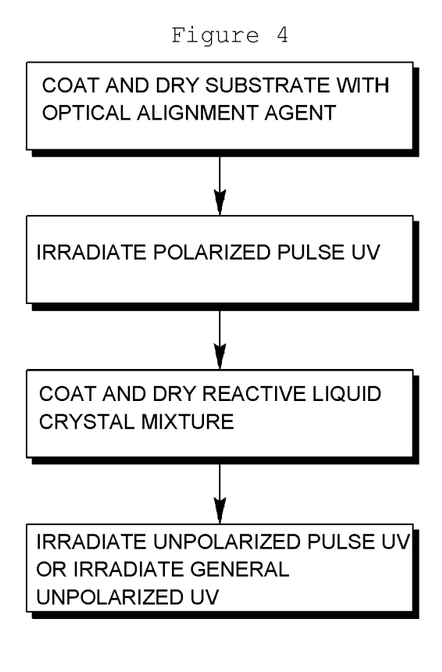
FIG. 4 is a flowchart illustrating an optical phase difference film using an optical alignment device according to an embodiment of the invention.

FIG. 4 is a flowchart illustrating a manufacturing method of an optical phase difference film using the optical alignment device according to the embodiment of the invention. Referring to FIG. 4, in order to manufacture an optical phase difference film, first, a substrate is coated with an optical alignment agent, and is dried. Subsequently, the substrate is irradiated with polarized pulse UV. In this case, the optical alignment device according to the embodiment of the invention can be used, and a multi-domain forming process may be included therein. Thereafter, coating and drying of a reactive liquid crystal mixture are performed, and the substrate is irradiated with unpolarized pulse UV or general unpolarized pulse UV, thereby being finished.

Figure 5:
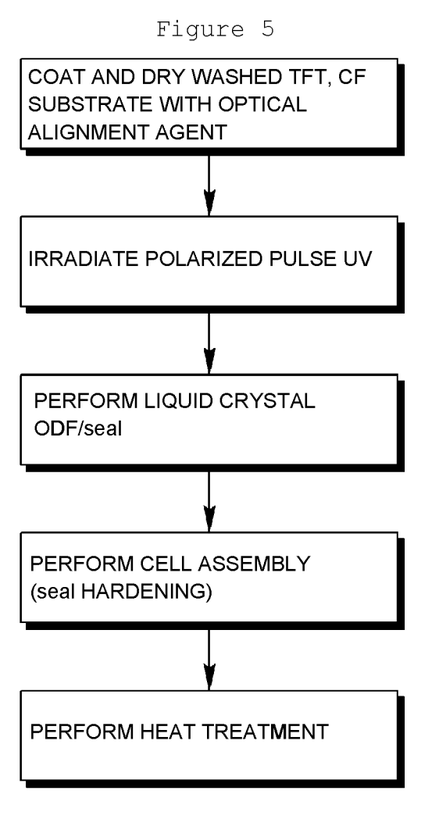
FIG. 5 is a flowchart illustrating a general liquid display device using an optical alignment device according to an embodiment of the invention.

FIG. 5 is a flowchart illustrating a manufacturing method of a general liquid crystal display device using the optical alignment device according to the embodiment of the invention. Referring to FIG. 5, first, a washed TFT substrate or CD substrate is coated with an optical alignment agent and is dried. Subsequently, the substrate is irradiated with polarized pulse UV. In this case, the optical alignment device according to the embodiment of the invention may be used, and a multi-domain forming process may be included therein. Thereafter, liquid crystal is injected by an ODF (one-drop-filling) method and is sealed up, a cell assembly step including seal hardening is performed thereon, and then a heat treatment is performed as finishing.

INDUSTRIAL APPLICABILITY

According to an optical alignment device using pulse UV according to a preferred embodiment of the invention, an exposure processing time of an optical alignment agent including reactive liquid crystal using polarized pulse UV, thereby improving productivity and being easy in mass production.

Moreover, since the polarized pulse UV is used, the optical alignment device has alignment property and alignment stability to have excellent phase difference ability.

What is claimed is:

1. An optical alignment device using pulse UV comprising:
   a chamber;
   a lamp which is installed at an upper portion of the chamber and emits pulse UV light;
   a stage which is provided at a lower portion of the chamber and on which a substrate having an alignment film formed on a surface of the substrate is placed; and
   a polarizer which is installed detachably between the stage and the lamp.

2. The optical alignment device using pulse UV according to claim 1, further comprising a band pass filter which is disposed between the lamp and the polarizer.

3. The optical alignment device using pulse UV according to claim 1, wherein the lamp is installed in a housing installed on one side of the upper portion of the chamber.

4. The optical alignment device using pulse UV according to claim 1, wherein the polarizer is installed to be replaceable on a support base installed between the lamp and the stage.

5. The optical alignment device using pulse UV according to claim 4, wherein the support base is installed horizontally between the lamp and the stage and has an opening portion, and a coupling portion having a slide groove is formed along an edge of the opening portion of the support base to insert the polarizer, thereby mounting the polarizer to the support base.

6. The optical alignment device using pulse UV according to claim 5, wherein the support base is movable and configured to rise and fall in the chamber.

7. The optical alignment device using pulse UV according to claim 1, wherein the stage is installed to be slid along one side of the chamber.

8. The optical alignment device using pulse UV according to claim 1, wherein the stage is installed to adjust a height thereof.

9. The optical alignment device using pulse UV according to claim 1, wherein the pulse UV light has energy of 0.1 mJ/pulse to 500 J/pulse.

10. The optical alignment device using pulse UV according to claim 1, wherein the pulse UV light is irradiated at 1 Hz to 60 Hz.

* * * * *